United States Patent [19]

Laib et al.

[11] 4,116,051
[45] Sep. 26, 1978

[54] ENGINE LOAD-PROPORTIONAL WORKING TIME MEASUREMENT

[75] Inventors: Lajos Laib; György Kómándi; Nándor Polyák; János Bolyky, all of Budapest, Hungary

[73] Assignee: Csepel Muvek Hiradastechnikai Gepgyara, Budapest, Hungary

[21] Appl. No.: 751,055

[22] Filed: Dec. 16, 1976

[51] Int. Cl.$^2$ .................. G01K 3/04; G01M 15/00
[52] U.S. Cl. ........................................................ 73/116
[58] Field of Search .................. 73/116, 117.3, 346

[56] References Cited
U.S. PATENT DOCUMENTS

| | | | |
|---|---|---|---|
| 3,318,151 | 5/1967 | Behrendt et al. | 73/116 UX |
| 3,357,239 | 12/1967 | Hohenberg | 73/116 |
| 3,472,068 | 10/1969 | List et al. | 73/116 |
| 3,584,507 | 6/1971 | Hohenberg | 73/116 |

Primary Examiner—Jerry W. Myracle
Attorney, Agent, or Firm—Young & Thompson

[57] ABSTRACT

This invention relates to a method — and also measuring equipment — for establishing load-proportional working characteristics such as real load or load-proportional working time of internal combustion machines used in prime movers or machines as well as in motor vehicles.

The invention is based on the conception that not only the pressure but also the average temperature prevailing during the working cycle can be utilized for establishing a load-proportional working characteristic.

In the course of the method according to the invention a load-proportional system characteristic is established by measuring the temperature of the exhaust gas of the motor, and the measured value of the load-proportional working characteristic sought for is derived from the signal representing the temperature.

The measuring equipment according to the invention comprises a temperature measuring element arranged in the flow path of the exhaust gases of the motor, a measuring circuit connected over its input to the said measuring element, and a display means connected to the output of the said measuring circuit.

In a preferred embodiment of the invention, the measuring circuit comprises an amplifier connected to the output of the said measuring element, a voltage-frequency converter connected to the output of the said amplifier, and a pulse counter stage connected to the output of the said converter whereas the means for displaying the load-proportional working time is connected to the output of the pulse counter stage, and the means for displaying the motor load is connected to the output of the said voltage-frequency converter.

2 Claims, 4 Drawing Figures

ENGINE LOAD-PROPORTIONAL WORKING TIME MEASUREMENT

This invention relates a method for establishing load-proportional working characteristics such as real load or load-proportional working time of internal combustion machines used in prime movers or machines as well as in motor vehicles.

The invention also relates to measuring equipment for the performance of the said method.

The value of the load of internal combustion engines used in prime movers, machines, or motor vehicles varies during work proportionally to the resistance to be overcome. The internal combustion machine is seldom run with maximum load, its working capacity is generally not exhausted.

It is very important as far as the economic running and complete exploitation is concerned to know the loadproportional working characteristics.

The knowledge of the real performance makes it possible to approach the optimum co-ordination of motor vehicle and resisting-force or of primary mover and machine, respectively.

The load-proportional working time is characteristic for the degree of wearing. Its knowledge makes it possible to check the compliance with fuel and lubricating oil norms and also to establish the real amortization time (i.e. the lifetime as a function of the working conditions) and an optimum time-table for planning the maintenance and repair work.

The performance of an internal combustion machine such as Diesel or petrol engine (hereinafter referred to as motor) is characterized by its work performed during a working cycle. According to the prior art the value of this work is established by the following method. A pressure measuring element is coupled to the combustion chamber, and the pressure-proportional output signal of the said measuring element is integrated over the piston path. This method utilizes, thus, the pressure prevailing in the combustion chamber — as a system characteristic — for the generation of a load-proportional signal.

This method is in principle correct but according to the prior art it is not yet possible to build-in into the vehicle — as an accessory — such a measuring device in a manner as to make it continually work all over the working time. The main hindrance is the difficulty to find the proper shape and location for the pressure measuring element.

For this reason, the prior art method is only applied in laboratory work, preferably in developing or testing motors.

The invention has been conceived in order to develop a method and measuring equipment for establishing loadproportional working characteristics of motors used in prime movers or machines as well as in motor vehicles which offers the advantage over methods according to the prior art that the motor can be observed continuously during work by means of a measuring device built into the vehicle — as an accessory — and performing its duty over the whole working time.

The invention is based on the conception that not only the pressure but also the average temperature prevailing during the working cycle can be utilized for establishing a load-proportional working characteristic.

In the course of the method according to the invention a load-proportional system characteristic is established by measuring the temperature of the exhaust gas of the motor, and the measured value of the load-proportional working characteristic sought is derived from the signal representing the temperature.

The value of the load-proportional working time can, e.g. be obtained if the signal representing the said temperature is, during the running time, integrated by a digital means, and the value of the integral is displayed.

If the method is applied in order to obtain the value of the load, a load signal is generated by transforming — according to a linear function — the signal representing the said temperature, and the said load signal is coupled to an analog or digital display means.

The measuring equipment according to the invention comprises a temperature measuring element arranged in the flow path of the exhaust gases of the motor, a measuring circuit connected over its input to the said measuring element, and a display means connected to the output of the said measuring circuit.

In a preferred embodiment of the invention, the measuring circuit comprises an amplifier connected to the output of the said measuring element, a voltage-frequency converter connected to the output of the said amplifier, and pulse counter stage connected to the output of the said converter whereas the means for displaying the load-proportional working time is connected to the output of the pulse counter stage, and the means for displaying the motor load is connected to the output of the said voltage-frequency converter.

It is an advantage of the solution according to this invention that the load of a machine or vehicle comprising an internal combustion engine can be observed continuously or according to need during the whole working time, this observation including the displaying of overload and the measuring of the load-dependent wearing away of the motor.

Comparing the value of the load-proportional working characteristic with other characteristics, one can obtain a number of conclusions which have according to prior art up till now not been obtainable. A useful conclusion can e.g. be drawn if comparing the real working time with the load-dependent (i.e. load weighted) working time in order to evaluate the co-ordination of prime mover and machine and the average degree of exploitation of the prime mover capacity.

The invention will now be described more particularly with reference to the annexed drawings showing preferred embodiments or diagrams, respectively.

The average temperature of internal combustion machines over a working cycle is proportional to the fuel quantity supplied into the combustion chamber within a time unit. It is, thus, also proportional to the power performed by the motor. The average temperature over a working cycle or any other combustion temperature that is proportional to the average one can be considered as power-proportional system characteristics.

Figure 1:
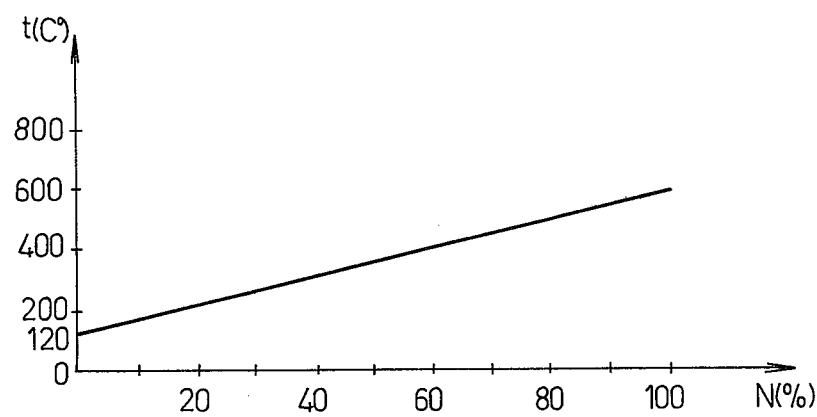
FIG. 1 shows the diagram of the exhaust gas temperature as a function of the motor load.

FIG. 1 shows the temperature of the exhaust gas in dependence of the motor load. It can be seen from the diagram that the relationship is a linear one; the temperature of the exhaust gas is up to 120° C in a no-load run whereas up to 550° C at maximum load, the temperature being measured in the exhaust pipe end.

For establishing the load-proportional working characteristics, the temperature of the exhaust gas is measured and considered as load-proportional system characteristic, and the measured value of the load-proportional working characteristic sought for is derived from the signal representing the said temperature.

Most characteristic of the load-proportional working characteristics is the relative value of the load within a range beginning at idle run and including the beginning of overload. It can be expressed in HP, in kW or even in %. This characteristic is hereinafter referred to as "load".

A measuring network realizing a linear function is used to derive the load signal from the signal representing the temperature (for the linear function see FIG. 1), and the numerical value of the load characteristic can be obtained by coupling the load signal to the input of an analog or digital display means.

A further load-proportional working characteristic is the load-proportional working time which can be obtained as the product of the relative value of the load and the working time given in hours.

The load-proportional working time is generated in the following manner. The signal representing the temperature is integrated during the running time by a digital means, and the value of the integral is displayed or recorded, e.g. at a magnetic tape memory.

The quotient of the load-proportional working time and the real working time is a further load-proportional working characteristic, i.e. a feature characterizing the average degree of exploitation of the motor.

The comparison of the load-proportional feature with other working characteristics can be the source of a number of further useful informations.

Figure 2:
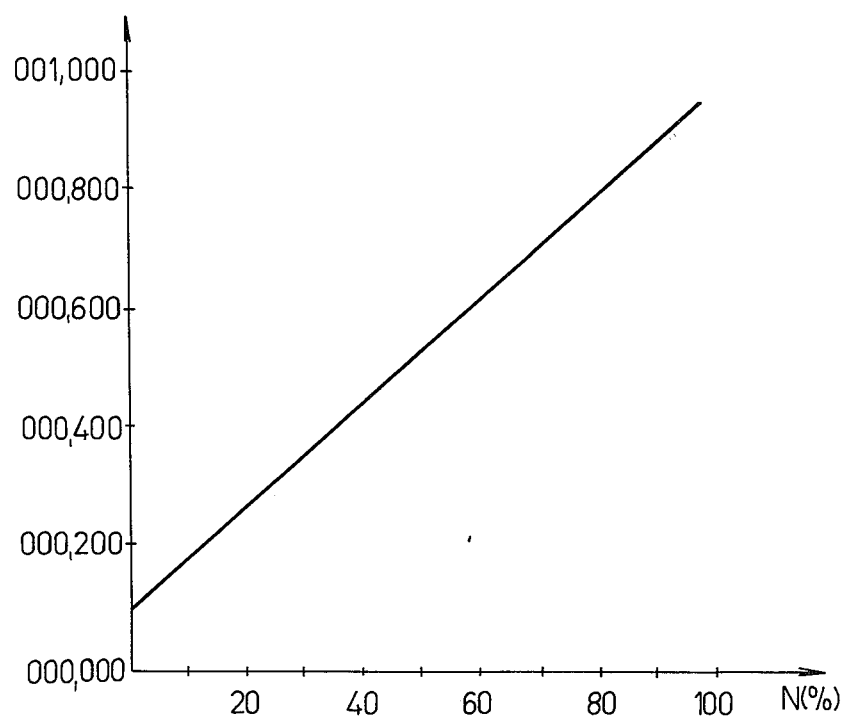
FIG. 2 shows a diagram of the load-weighted working hour as a function of the motor load.

FIG. 2 shows a diagram of the load-proportional working time. The abscissa represents the load. The values readable at the digital display means and representing the load-proportional working time of a real working hour are listed on the ordinate. It can be seen from FIG. 2 that, e.g. in the case of a relative load of N = 70%, the load-proportional working time of a real working hour is equal to 0.74.

The measuring network can also be adjusted in a manner as to cause no change in the displayed value of the load-proportional working time during idle-run. In this case, the display means will advance according to half an hour's value if the motor is run for a whole hour at 50% of the rated power whereas it will display 0.25 hour's value of increase — as compared with the value displayed an hour ago — if the motor is run at 0.25 rated load during a real working hour.

If the real working time is simultaneously also measured and compared with the above load-proportional working time, useful conclusions can be drawn concerning the effectiveness of machine interconnections and other measures in the field of work organization. The quotient of the two kinds of working time has an optimum at about 85-95% since some idle-run is inevitable when starting and stopping the motor. If the technical state of the motor is sinking, the temperature of the exhaust gas as a function of the value of load increases. That means that at a given value of load the counting of load-proportional working hours will accelerate. Thus, the wearing away of the motor is indicated, and the protection of the motor can be provided for.

Figure 3:
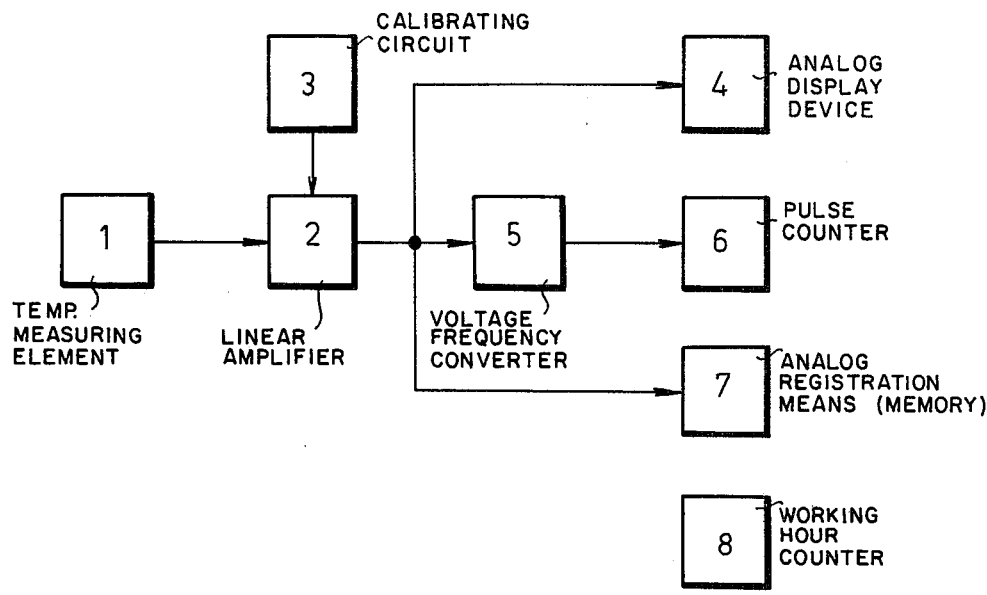
FIG. 3 shows the block diagram of a preferred embodiment of the measuring equipment.

FIG. 3 shows a preferred embodiment of the measuring equipment according to the invention in block diagram.

The measuring equipment comprises a temperature measuring element 1 arranged in the flow path of the exhaust gas of the motor — preferably in the exhaust pipe end. The measuring element can be a thermocouple or a thermosensitive resistor connected to a power supply. A linear amplifier 2 is connected to the output of the measuring element 1. The gain and the output level of the amplifier 2 can be set by the calibrating circuit 3 so that the characteristic as shown in FIG. 1 can be realized by the coupling together of the measuring element 1 and the amplifier 2. On the one hand, an analog display device 4 is coupled to the output of the amplifier 2 showing the value of the load immediately. On the other hand, a voltage-frequency converter 5 is coupled to the said output whereas the output of the converter 5 is coupled with a pulse counter 6 displaying the load-proportional working time. Furthermore, an analog registration means (memory) 7 can be connected to the output of the amplifier 2 if a subsequent processing of the measured values is wanted. A working-hour counter 8 is furthermore incorporated into the measuring equipment counting the working hours continuously during the run of the motor.

The manner of function of the motor is the following:

An analog signal appears at the otuput of the measuring element 1 that is proportional to the temperature of the flue gases. The said signal is amplified by the amplifier 2 having a calibrated characteristic. The load-proportional signal appears at the output of the amplifier 2, and is displayed by the device 4 and stored by the analog registration means (memory) 7. The voltage-frequency converter 5 derives from the said load-proportional signal a signal the pulse frequency of which being proportional to the voltage of the load-proportional signal. The pulses are counted by the pulse counter 6 during the time displayed by the working-hour counter 8.

The analog display device 4 is calibrated in HP, kW, or percentage of the rated power. The transform ratio of the voltage-frequency converter 5 is chosen in a manner as to provide for the correct function of the pulse counter 6, i.e. the latter one shall advance by an increment representing a load-proportional working hour if the motor has been run for a real working hour with a N = 100% load.

Figure 4:
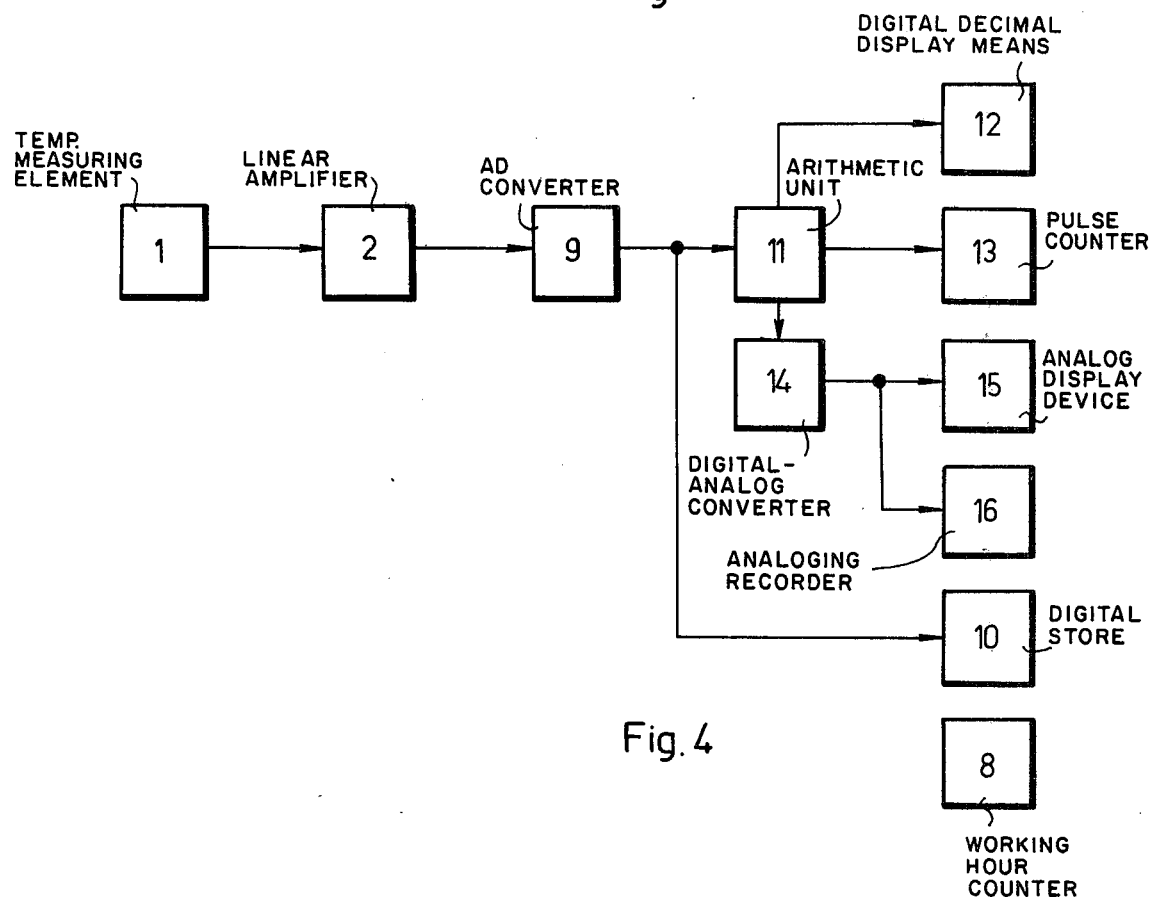
FIG. 4 shows the block diagram of another embodiment of the invention.

Another preferred embodiment of the measuring equipment serving to perform the method according to the invention is shown in FIG. 4 in block diagram.

A liner amplifier 2 is connected to the output of the measuring element 1, and an AD-converter 9 is connected to the output of the amplifier 2 transforming the analog output signal of the amplifier 2 (appearing as voltage) into a digital signal. A digital store 10 can be connected to the output of the AD-converter 9 for subsequent date processing. Furthermore, an arithmetic unit 11 is connected to the output of the AD-converter 9 performing the calibrating operations for the display and controlling the elements connected to it. On the one hand, a digital, decimal display means 12 can be connected to the output of the arithmetic unit 11 showing the instant value of the output in HP or in the percentage of the rated power, on the other hand, a pulse counter 13 is connected to an output of the arithmetic unit 11 showing the number of load-proportional working hours.

A third output of the digital arithmetic unit 11 controls a digital-analog converter 14 to the output of which an analog display device 15 is connected showing the instant load in an analog manner. If subsequent — off-line — evaluation is needed, an analog signal recorder 16 (magnetic tape store or registration means) can also be connected to the output of the DA-converter 14.

The working hour counter 8 is also in this embodiment incorporated. The starting and stopping of the working hour counter 8 is simultaneously performed when starting or stopping the other parts of the measuring equipment but its working is otherwise independent of the other parts of the measuring equipment.

The measuring equipment is supplied from a stabilized power supply (voltage supply), preferably one equipped with secondary batteries.

What we claim is:

1. A method for establishing load-proportional working characteristics of internal combustion motors comprising establishing a load-proportional system characteristic by measuring the temperature of the exhaust gas of the motor, producing a signal representing the temperature of the exhaust gases, generating a load signal by transforming according to a linear function the signal representing the said temperature, and coupling the said load signal to an analog or digital display means.

2. A method as claimed in claim 1, applied in order to obtain the value of the load-proportional running time, characterized in that the signal representing the said temperature is during all the working time of the motor integrated by a digital means, and the value of the integral is displayed.

* * * * *